United States Patent
Hansel et al.

(10) Patent No.: US 6,886,712 B2
(45) Date of Patent: May 3, 2005

(54) SEALING COVER FOR A PROCESSING HOLE IN ALUMINUM SHEET METAL

(75) Inventors: Mathias Hansel, Rummingen (DE); Harald Dorst, Weil am Rhein (DE)

(73) Assignee: A. Raymond & CIE, Grenoble (FR)

(*) Notice: Subject to any disclaimer, the term of this patent is extended or adjusted under 35 U.S.C. 154(b) by 0 days.

(21) Appl. No.: 10/247,236

(22) Filed: Sep. 19, 2002

(65) Prior Publication Data

US 2003/0052132 A1 Mar. 20, 2003

(30) Foreign Application Priority Data

Sep. 20, 2001 (DE) .......................................... 101 46 419

(51) Int. Cl.$^7$ .............................................. B65D 43/04
(52) U.S. Cl. .................................. 220/802; 220/359.4
(58) Field of Search .............................. 220/802, 359.4, 220/359.1, 309.5, 294, 298, 302, 787, 789, 257.1, 315, 316, 308, 359.5; 428/63; 156/74; 264/40.6, 46.4

(56) References Cited

U.S. PATENT DOCUMENTS

| | | | | |
|---|---|---|---|---|
| 3,851,794 A | * | 12/1974 | Hehl ........................... | 220/789 |
| 3,990,604 A | * | 11/1976 | Barnett et al. ............... | 220/787 |
| 4,094,436 A | * | 6/1978 | Birmingham ................ | 220/315 |
| 4,290,536 A | * | 9/1981 | Morel ......................... | 220/789 |
| 4,363,420 A | | 12/1982 | Andrews | |
| 4,494,671 A | * | 1/1985 | Moore et al. ............. | 220/257.1 |
| 4,560,083 A | * | 12/1985 | Danico ........................ | 220/786 |
| 4,588,105 A | * | 5/1986 | Schmitz et al. .............. | 220/787 |
| 5,267,667 A | * | 12/1993 | Cozzani ...................... | 220/787 |
| 5,505,324 A | * | 4/1996 | Danico ........................ | 220/201 |
| 5,513,769 A | * | 5/1996 | de Baets ..................... | 220/787 |

* cited by examiner

*Primary Examiner*—Lien Tm Ngo
(74) *Attorney, Agent, or Firm*—Gifford, Krass, Groh, Sprinkle, Anderson & Citkowski, P.C.

(57) ABSTRACT

The present cover is used for permanent sealing of an oval-shaped processing hole (7) in aluminum sheet metal (8) by means of an adhesive joint. The cover consists of a circular cover plate (1) of aluminum with a concentric cover edge (2) and a ring-shaped strip (3) of hot-melt adhesive applied within the cover edge (2). The interior region of the cover plate (1) is connected to a spring plate (5) aligned plane-parallel with the cover plate at a spacing of the thickness of the aluminum sheet metal (8). The outer edge (6) of the spring plate (5) has a contour that corresponds to the shape of the oval processing hole (7) and includes quarter-circular spring tongues (11) which are brought to a tight fit by spring force against the back side of the aluminum sheet metal (8) by a quarter turn of the cover plate to produce the necessary pressure on the adhesive strip (3).

18 Claims, 2 Drawing Sheets

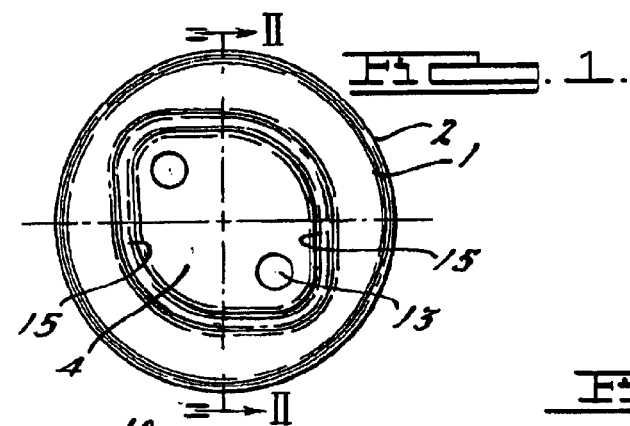
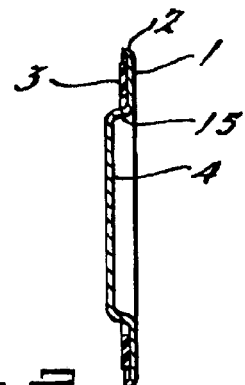
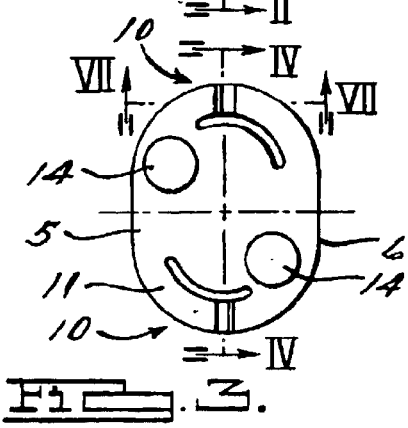
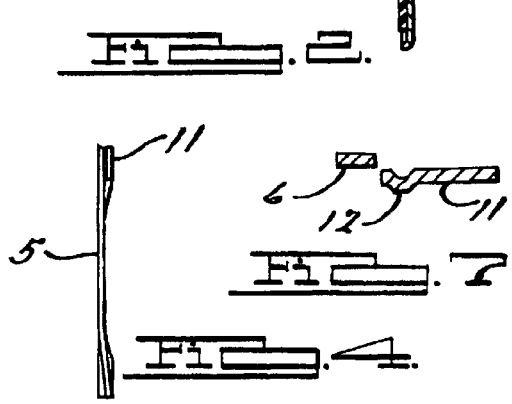
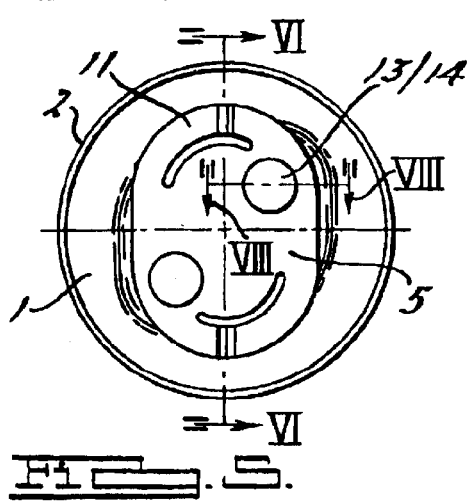
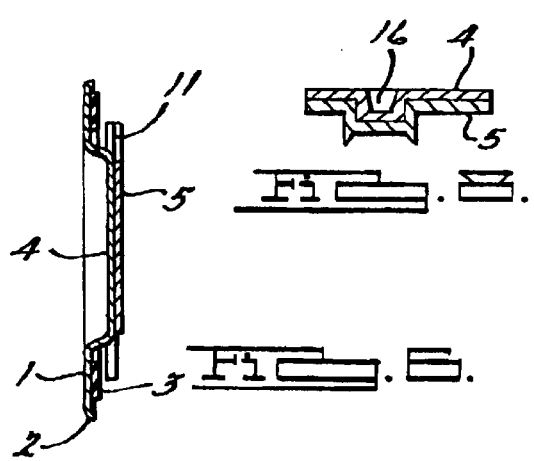
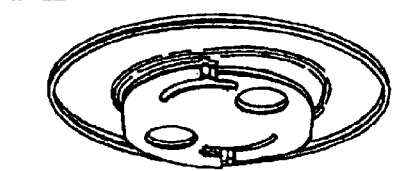
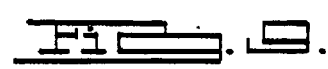
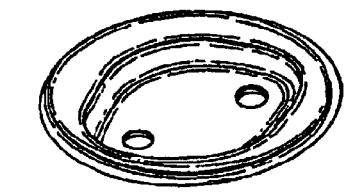
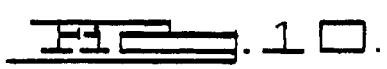

SEALING COVER FOR A PROCESSING HOLE IN ALUMINUM SHEET METAL

RELATED APPLICATION

This application claims priority of German Patent Application No. 101 46 419.3 filed Sep. 20, 2001.

FIELD OF THE INVENTION

The invention pertains to a cover for permanent sealing of an oval-shaped processing hole in aluminum sheet metal by means of an adhesive joint. The cover consists of a circular aluminum plate with a concentric cover edge and a ring-shaped strip of hot-melt adhesive applied within the cover edge.

BACKGROUND OF THE INVENTION

In the case of an automobile chassis manufactured from aluminum, there are a number of processing holes which have to be resealed by large covers after they are no longer needed. In order to seal the holes water-tight, a cover made of the same aluminum material is glued onto the hole by using a hot-melt adhesive. In this case it is necessary that the adhesive strip applied within the edge of the cover be about 0.5 to 0.7 mm higher than the edge of the cover. In addition, in order to save energy and time, it is useful for the adhesion process to be conducted in conjunction with the catalytic immersion bath lacquering of the aluminum chassis. Thus, the heating process that is performed after the immersion bath can be used at the same time for melting and hardening of the adhesive.

However, a disadvantage of this technique is that it is important that the cover be pressed onto the hole tightly around the aluminum sheet and that it be held down until the adhesive has hardened. Thus, there is a need in the art for a cover that is rigidly retained on the aluminum until the adhesive has hardened.

SUMMARY OF THE INVENTION

With regard to the cover formation described above, it is proposed that the interior region of the cover plate be connected to a spring plate aligned in a plane-parallel with the cover plate, and at a spacing corresponding to that of the thickness of the aluminum sheet metal. The outer edge of the spring plate has a contour that corresponds to the shape of the oval processing hole and is somewhat smaller than the perforated edge. In the most separated and longitudinal edge regions of the oval-shaped spring plate are integrally formed spring tongues having a protrusion at their free ends. In this example, the spring tongues have a quarter-circular shape. The spring plate is inserted into the processing hole in the aluminum sheet, until the adhesive strip is in contact with the aluminum sheet. The spring plate can be brought in a tight fit to the aluminum sheet, due to the spring force of the spring tongues against the back side of the aluminum sheet metal with a quarter turn of the cover plate.

Advantageously, the cover designed according to this invention can be quickly and easily placed into and brought into contact with the processing hole by a rotation of 90° after introduction of the spring plate mounted to the underside of the cover. Another advantage of the present invention is that the cover will be securely held in place against the sheet metal by the spring tongues. Since no immersion bath fluid can get between the surfaces to be glued during the subsequent catalytic immersion bath lacquering, a dependable connection is achieved in a simple manner after melting and hardening of the adhesive in the subsequent heating process. A further advantage of the invention is that the cover is mechanically secured by the spring tongues, and remains highly resistive even in case of stress.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 illustrates the cover plate of the sealing cover according to this invention, presented in top view;

FIG. 2 is a cross-section view through the cover plate along line II—II in FIG. 1;

FIG. 3 illustrates the associated spring plate presented in top view;

FIG. 4 illustrates the spring plate shown in side view;

FIG. 5 illustrates the sealing cover ready for use and seen from below;

FIG. 6 illustrates the sealing cover presented in cross-section along line VI—VI in FIG. 5;

FIG. 7 is a partial cross-section view through the spring tongue along line VII—VII in FIG. 3;

FIG. 8 is a partial cross-section view through the connection point along line VIII—VIII in FIG. 5 after the pass-through joining process;

FIG. 9 illustrates the sealing cover shown in perspective view, from below;

FIG. 10 illustrates the sealing cover shown in perspective view, from above;

DETAILED DESCRIPTION OF THE INVENTION

Figure 11:
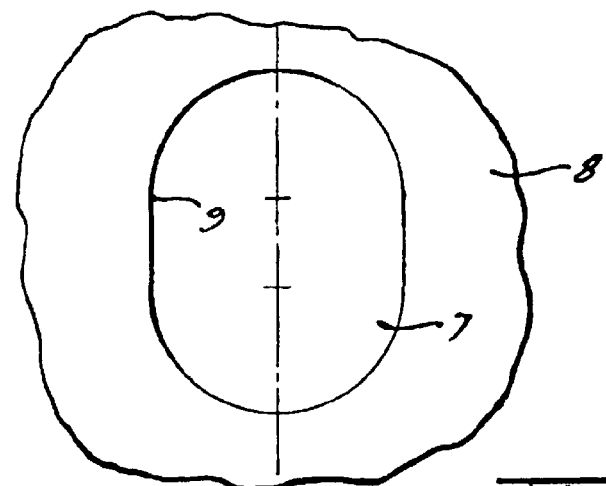
FIG. 11 illustrates the oval processing hole shown in top view.

The sealing cover illustrated in FIGS. 1–14 includes a circular cover plate 1 made of aluminum material, and having a concentrically beaded cover edge 2 which is used for a flush contact upon the aluminum sheet metal 8. The sealing cover also includes a spring plate 5 which can be joined to the cover plate 1 in such a manner that the cover plate 1 and spring 5 are locked together, and rotatable as a single unit. The cover plate 1 is inserted into the processing hole 7 of the metal sheet 8, and protruding adhesive 3 comes into contact with the aluminum sheet metal 8. The spring plate 5 can be brought to rest against the back side of the sheet metal 8 by a quarter turn of the sealing cover.

Figure 12:
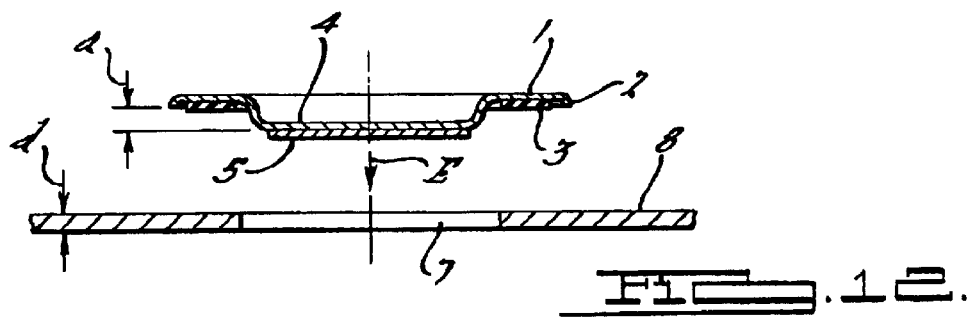
FIG. 12 illustrates the sealing cover before introduction of the spring plate into the processing hole.

Adjacent to the cover edge 2 of the cover plate 1 is a circular strip 3 made of a hot-melt adhesive. The strip 3 is designed at a height such that the strip 3 extends above the cover edge 2 by about 0.5 to 0.7 mm. The central or interior region of the cover plate 1 includes a protrusion, which is molded or pressed onto the cover plate 1 and serves as a support surface 4 for the aforementioned spring plate 5. The support surface 4 is in a plane parallel to the plane of the cover plate 1. It should be appreciated that a distance "a"

between the support surface 4 and the cover edge 2 is a little greater than the thickness "d" of the aluminum metal sheet 8 to be covered by the cover plate 1 (see FIG. 12).

The outer edge 6 of the spring plate 5, as illustrated in FIGS. 3 and 4, has a contour which corresponds to the shape of the oval processing hole 7 in the aluminum metal sheet 8, as illustrated in FIG. 11. However, the outer edge 6 is slightly smaller than the perforated edge 9 of the processing hole 7 in the metal sheet 8.

Figure 14:
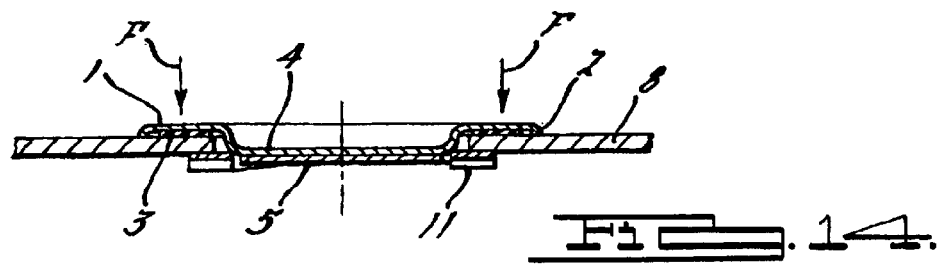
FIG. 14 illustrates the sealing cover locked in position in the processing hole after a rotation by 90°.

The spring plate 5 includes two integrally formed spring tongues 11. The spring tongues are positioned opposite each other, near the outer edge of the spring plate 5. The spring tongues 11 in this example have a quarter-circular shape. The spring tongue 11 is stamped out of the surface of the spring plate 5. Thus, the tongue 11 is a spring-like member extending from the spring plate 5. A bulge 12 is formed near a free end of each of the spring tongues 11 (as shown in FIG. 7). The bulge 12 extends out in a direction towards the cover plate 1. It should be appreciated that when the spring plate 5 is rotated in the processing hole 7, these bulges or protrusions 12 slide over the surface of the aluminum metal sheet 8 and thus generate a force of the spring plate against the metal plate 8 (FIG. 14). It should also be appreciated that instead of the bulges 12, hemispherically-shaped knobs can also be used.

The support surface 4 includes at least two holes 13 formed in the support surface 4 of the cover plate 1. The spring plate 5 has a corresponding number of drilled holes 14 positioned at the same location and spaced from each other as the holes 13 formed in the support surface 4 of the cover plate 1. The holes 13, 14 are intended for joining the cover plate 1 to the spring plate 5 by riveting or by other means. The planar-parallel protrusions 4 includes integrally formed mutually parallel inner walls 15. The walls 15 may serve as contact surfaces for a correspondingly caterpillar-shaped head of a turning tool and may also act as the stop position for securing the sealing cover to the metal sheet 8.

The cover plate and spring plate 5 are joined together so that the plates 1, 5 are locked together, and the entire sealing cover assembly is rotatable in the processing hole in the metal sheet 8. Instead of conventional riveting, the joint between the spring plate 5 and the support surface 4 can also be produced by a pass-through joining process, as shown in FIG. 8. It should be appreciated that the resulting recesses 16 in the support surface 4 from joining the plates 1, 5 together can then also be used as contact surfaces for a turning tool equipped with corresponding pins used to rotate the sealing cover with respect to the metal sheet 8.

Figure 13:
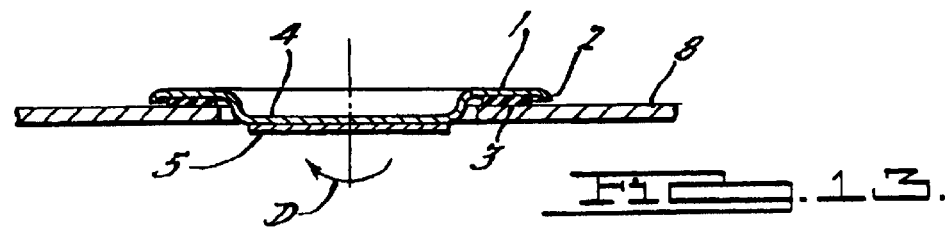
FIG. 13 illustrates the sealing cover after introduction of the spring plate into the processing hole.

FIGS. 12 to 14 illustrate a method for assembling the sealing cover on the aluminum metal sheet 8. FIG. 12 shows the sealing cover before insertion of the spring plate 5 portion of the sealing cover in the direction "E" of the arrow into the oval processing hole 7, which is visible in FIG. 11 in a top view. The spring plate 5 is fully immersed into the hole 7 in the metal sheet 8 (as shown in FIG. 13), until the adhesive strip 3 is resting upon the aluminum sheet metal 8. The sealing cover is then rotated by 90° in direction "D" of the arrow. For example, a tool may be used to engage the recess 16 in the support surface 4 and rotate the sealing cover. At the same time, the spring tongues 11 with their bulges or knobs 12 at the free end travel along a back side of the aluminum metal sheet 8. The spring force exerted by the spring tongues 11 in the direction "F" of the arrow generates a necessary pretension on the adhesive strip 3, as shown in FIG. 14.

The sealing cover is now seated securely in the processing hole 7 of the metal sheet 8. The sealing cover and metal sheet 8 are finished by moving together into the oven and through the catalytic immersion bath lacquering means. This process will then melt the adhesive strip 3 due to the temperature of the oven, which may be up to 200° C. After hardening of the aluminum sheet metal 8 with the sealing cover, the adhesive strip will form a water-tight joint around the processing hole 7 in the metal sheet 8. This bonding process results in the sealing cover resting with its cover edge 2 against the aluminum metal sheet 8.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A sealing cover for permanently sealing a processing hole having a predetermined shape in a metal sheet having a predetermined thickness comprising:
    a cover plate having a cover edge with an integrally formed concentric bead;
    a strip of adhesive disposed on said cover plate adjacent said cover edge; and
    a spring plate fixedly connected to said cover plate in a plane parallel to said cover plate and spaced from the cover edge of said cover plate a distance corresponding to the thickness of the metal sheet, wherein an outer edge of said spring plate has a shape corresponding to the shape of the processing hole in the metal sheet, and said spring plate includes at least two integrally formed spring tongues, with a free outer end of each spring tongue including an integrally formed protrusion extending towards said cover plate, for exerting a spring force on a back side of the metal sheet after rotating said sealing cover, to seal the processing hole in the metal sheet.

2. A sealing cover as set forth in claim 1 wherein said strip of adhesive extends a predetermined height above said cover edge.

3. A sealing cover as set forth in claim 1 further comprising a support surface protruding from a center portion of said cover plate, wherein said support surface is disposed in a plane parallel to said cover plate, and is spaced from said cover plate by an inner wall, and a height of said inner wall corresponds to the thickness of the metal sheet, where said spring plate is connected to said cover plate.

4. A sealing cover as set forth in claim 3 wherein said support surface is molded onto the center portion of said cover plate.

5. A sealing cover as set forth in claim 3 wherein said support surface includes at least two holes, and each hole in the support surface corresponds to a similar hole in said spring plate, and a joining means is disposed in each hole in the support surface and each corresponding hole in the spring plate, to join said cover plate to said spring plate.

6. A sealing cover as set forth in claim 5 wherein said support surface includes a recess for receiving a means for rotating said sealing cover.

7. A sealing cover as set forth in claim 1, wherein said cover plate and said spring plate are each made from the same metal material as the metal sheet.

8. A sealing cover as set forth in claim 7 wherein the material is aluminum.

9. A sealing cover for permanently sealing a processing hole having a predetermined shape in a metal sheet having a predetermined thickness comprising:

a cover plate having a cover edge with an integrally formed concentric bead;

a strip of adhesive disposed on said cover plate adjacent said cover edge, wherein said strip of adhesive extends a predetermined height above said cover edge;

a support surface protruding from a center portion of said cover plate, wherein said support surface is disposed in a plane parallel to said cover plate, and is spaced from said cover plate by an inner wall, and a height of said inner wall corresponds to the thickness of the metal sheet; and a spring plate fixedly connected to said support surface, wherein an outer edge of said spring plate has a shape corresponding to the shape of the processing hole in the metal sheet, and said spring plate includes at least two integrally formed spring tongues and a free end of each spring tongue includes an integrally formed protrusion extending towards said cover plate, for exerting a spring force on a back side of the metal sheet after rotating said sealing cover, to seal the processing hole in the metal sheet.

10. A sealing cover as set forth in claim 9 wherein said support surface is molded onto the center portion of said cover plate.

11. A sealing cover as set forth in claim 9 wherein said support surface includes at least two holes, and each hole in the support surface corresponds to a similar hole in said spring plate, and a joining means is disposed in each hole in the support surface and each corresponding hole in the spring plate, to join said cover plate to said spring plate.

12. A cover as set forth in claim 9 wherein said support surface includes a recess for receiving a means for rotating said sealing cover.

13. A cover as set forth in claim 9, wherein said cover plate and said spring plate are each made from the same metal material as the metal sheet.

14. A cover as set forth in claim 13, wherein the material is aluminum.

15. A method of permanently joining a sealing cover to a metal sheet, said method comprising the steps of:

providing a metal sheet having a processing hole with a predetermined shape and the metal sheet has a predetermined thickness;

assembling a spring plate to a cover plate, wherein the cover plate has a cover edge with an integrally formed concentric bead, and a strip of adhesive is disposed on the cover plate adjacent the cover edge, such that the spring plate is fixedly connected to the cover plate in a plane parallel to the cover plate and is spaced from the cover edge of said cover plate a distance corresponding to the thickness of the metal sheet, wherein an outer edge of the spring plate has a shape corresponding to the shape of the processing hole in the metal sheet, and the spring plate includes at least two integrally formed spring tongues, and a free end of each tongue including an integrally formed protrusion extending towards the cover plate;

placing the spring plate through the processing hole in the metal sheet so that the adhesive strip is adjacent a front side of the metal sheet;

seating the sealing cover in the processing hole in the metal sheet by rotating the sealing cover, wherein the spring tongue exerts a force on a back side of the metal sheet to fixedly hold the sealing cover to the metal sheet; and finishing the joined metal sheet and sealing cover to form a permanent joint between the sealing cover and the metal sheet by melting the adhesive strip, so that the cover edge is adjacent the front side of the metal sheet.

16. The method of claim 15 further including the step of providing a support surface protruding from a center portion of the cover plate in a plane parallel to the cover plate and spaced from said cover plate by an inner wall having a height corresponding to the predetermined thickness of the metal sheet, wherein the support surface includes a recess for receiving a means for rotating the sealing cover.

17. The method of claim 16 wherein said support surface includes at least two holes, and each hole in the support surface corresponds to a similar hole in the spring plate, and a joining means is disposed in each hole in the support surface and each corresponding hole in the spring plate, to join the cover plate to the spring plate.

18. The method of claim 15 wherein said cover plate and said spring plate are each made from the same metal material as the metal sheet.

* * * * *